United States Patent [19]
Van Den Dungen

[11] Patent Number: 5,135,149
[45] Date of Patent: Aug. 4, 1992

[54] APPARATUS FOR THE STORAGE AND TRANSPORT OF AN ELONGATE ENDLESS TAPE

[75] Inventor: Michiel G. Van Den Dungen, Baarn, Netherlands

[73] Assignee: Polygram International Holding B.V., Baarn, Netherlands

[21] Appl. No.: 220,774

[22] Filed: Jul. 18, 1988

[30] Foreign Application Priority Data

Jul. 16, 1987 [NL] Netherlands .................. 8701681

[51] Int. Cl.⁵ ........................................... B65H 17/32
[52] U.S. Cl. ..................................... 226/118; 226/97; 242/182
[58] Field of Search .................. 226/118, 119, 95, 7, 226/97; 242/182

[56] References Cited

U.S. PATENT DOCUMENTS

| | | | |
|---|---|---|---|
| 2,960,611 | 11/1960 | Namenyi-Katz | 226/118 X |
| 3,143,267 | 8/1964 | Maxey | 226/95 |
| 3,231,163 | 1/1966 | Chambers | 226/95 |
| 3,499,589 | 3/1970 | Johnson et al. | 226/118 X |
| 3,593,901 | 7/1971 | Eltz et al. | 226/95 |
| 3,669,328 | 6/1972 | Castelli | 226/118 X |
| 4,469,265 | 9/1984 | Manquen | 226/118 X |

Primary Examiner—Daniel P. Stodola
Assistant Examiner—Paul Bowen

[57] ABSTRACT

A storage bin (3) in which at least a part of the tape is stored as a package of tape loops (2a) has main walls (4), an entrance wall (5) and an exit wall (9), the walls (5, 9) being formed with an entrance slot (6) and an exit slot (10) respectively, and outlet openings of first and second pneumatic elements (15, 20) being provided near both slots to assist in the feed-in and feed-out of the tape. The main walls (4) of the bin (3) are disposed vertically or substantially vertically, the entrance slot (6) being situated near the upper side and the exit slot (9) near the lower side of the bin. At least one of the main walls (4) of the bin comprises a discharge element (16) allowing fluid to escape from the bin, which discharge element (16) is spaced from the entrance wall (5) and from the exit wall (9). Near the bottom of the bin wall portions of the exit wall (9) extend in a V-shape towards the exit slot (10) and at their upper sides they are provided with outlets of pneumatic element (19) to form a fluid cushion inside the bin (3) by fluid jets which converge to each other in an upward direction, the upper side of the cushion being situated at a distance above the exit slot (10) and the package of tape loops (2) floating on the cushion.

12 Claims, 3 Drawing Sheets

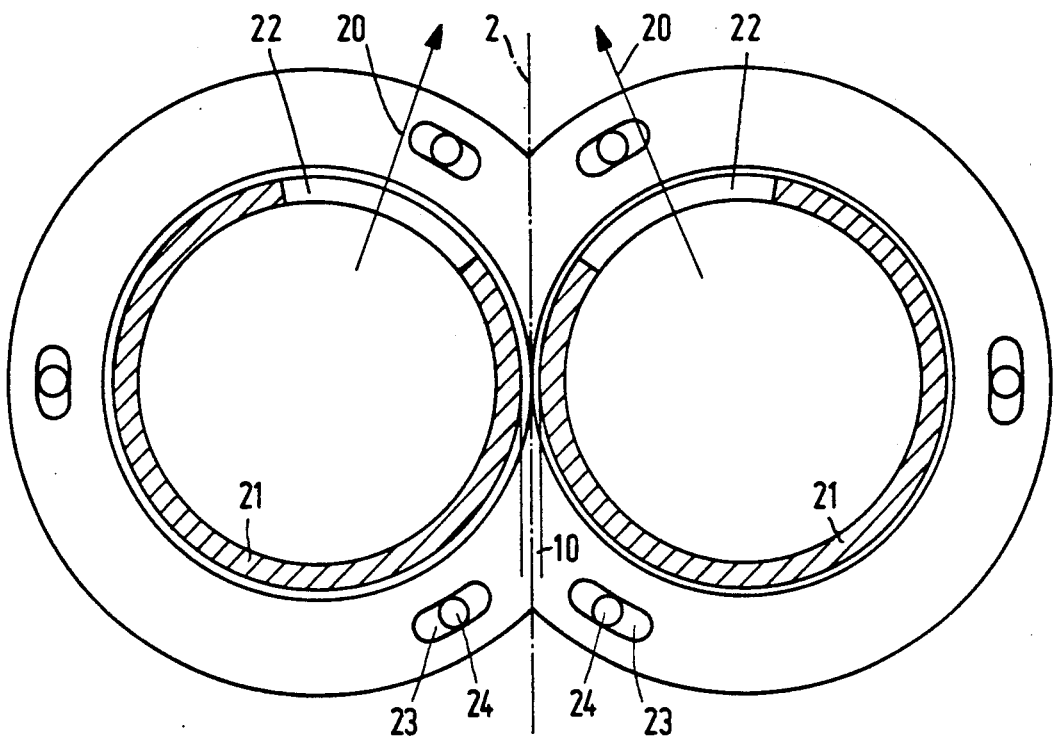
FIG.2
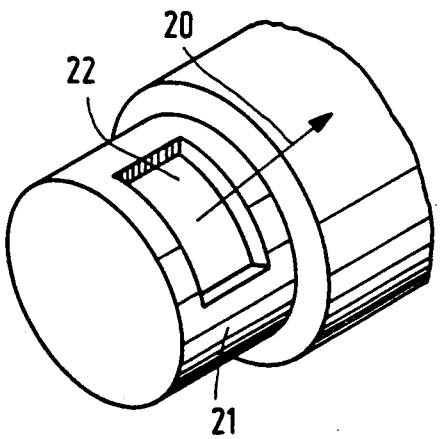
FIG.2A

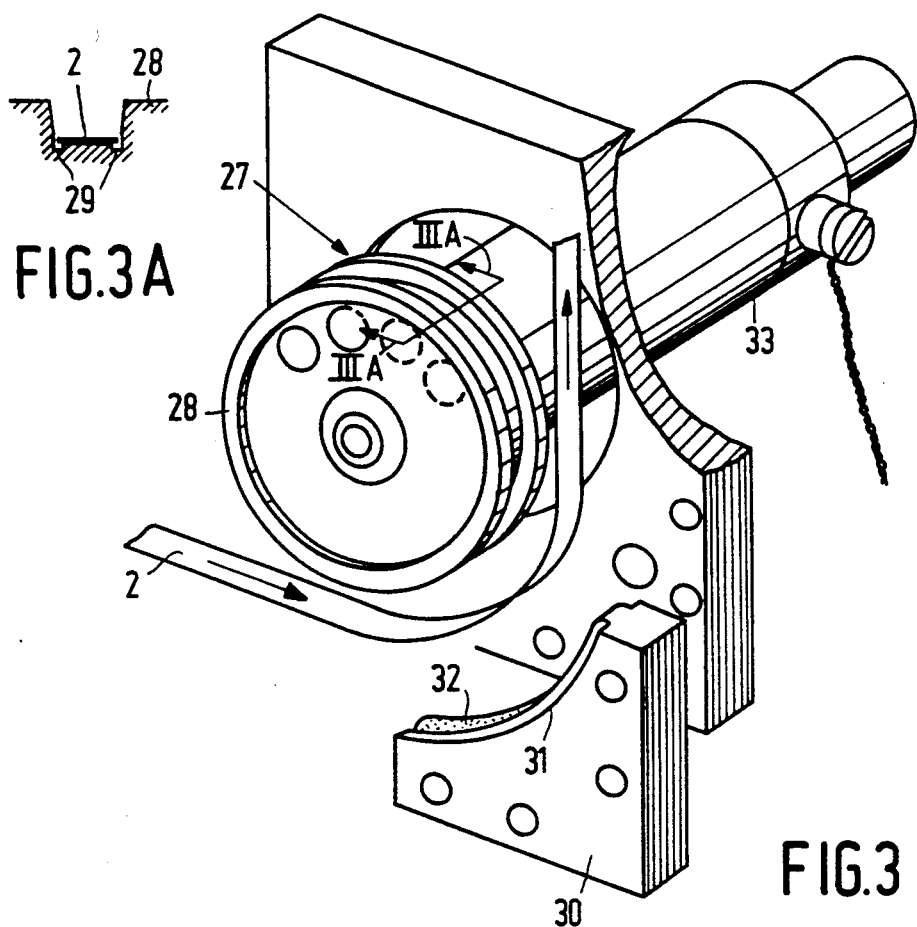
FIG.3A
FIG.3
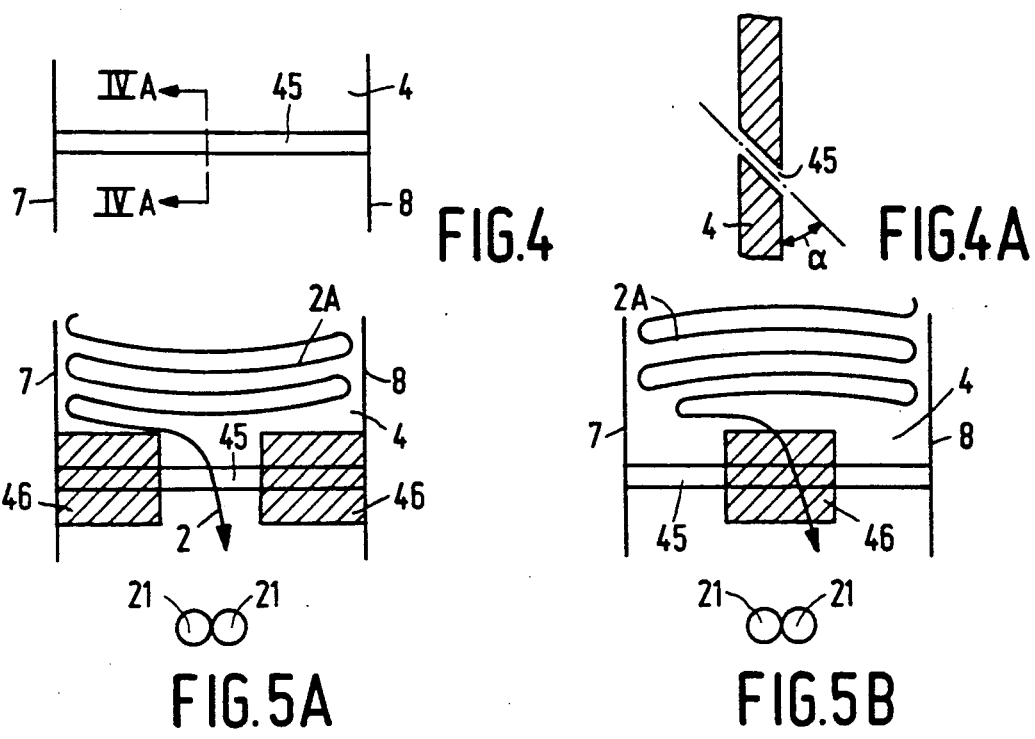
FIG.4
FIG.4A
FIG.5A
FIG.5B

APPARATUS FOR THE STORAGE AND TRANSPORT OF AN ELONGATE ENDLESS TAPE

BACKGROUND OF THE INVENTION

The invention relates to an apparatus for the storage and transport of an elongate endless tape, comprising a storage bin in which at least a part of the tape is stored as a package of tape loops. The bin comprises a front main wall and a rear main wall which guide the edges of the tape, two narrow sidewalls and an entrance wall at one side and an exit wall at the other side of the bin. The entrance wall has an entrance slot for the tape, near which entrance slot outlets of first pneumatic pressure means terminate to assist the supply of tape through the entrance slot by means of fluid jets. The exit wall has an exit slot for the tape, near which exit slot outlets of second pneumatic pressure means terminate to assist the exit of the tape through the exit slot by means of fluid jets. At least one of the main walls of the bin has discharge means for the discharge of fluid from the bin, which discharge means terminate in the main wall at a distance from the entrance wall and the exit wall. The exit wall has wall portions which extend from the narrow sidewalls of the bin towards the exit slot in a V-shape.

U.S. Pat. No. 4,128,198 discloses such an apparatus in which the storage bin is disposed and serves for the storage and feed-through of a specific length of endless master magnetic tape to pass this master magnetic tape continuously through a copying apparatus arranged externally of the storage bin. Thus, by means of the copying apparatus the master magnetic tape is copied on a multitude of duplicate magnetic tapes in a continuous process.

In the known apparatus the fluid jets from the first pneumatic means exert a specific force on the tape near the entrance slot to hold the tape away from the bounding walls of the entrance slot and to form tape loops which are driven towards the exist wall as a package. Directly adjacent the exit slot further fluid jets from second pneumatic means exert a force on the tape to align the tape relative to this slot and hold it away from the bounding walls of the slot to enable the tape to be fed to the copying apparatus without tugging or jerking. The outlets of the second pneumatic means are situated at opposite sides of the exit slot, so that these further fluid jets are directed substantially perpendicularly to the tape which moves through the slot. In practice, the further fluid jets therefore cannot adequately prevent tape loops from reaching the exit slot and moving through this slot, so that the tape transport at the exit slot may still exhibit flutter, which has a negative influence on the quality of the copying process. This effect increases as the tape is fed out of the bin at a higher speed.

If this known apparatus is arranged with a downward inclination towards the exit wall, this arrangement has the advantage that the package of tape loops moved more easily towards the exit wall under the influence of gravity, but conversely a pack of tape loops tends to pile up near the exit slot, which is liable to give rise to jerking or tugging of the tape at the exit slot.

Moreover, it is found in practice that when the package of tape loops is pushed towards the exit wall the tape edges, with which the tape rests on the lower main wall of the bin, are susceptible to damage. Irregular movement of the tape as it is fed through the exit slot, the tape generally still having the form of loops, is also likely to cause damage to the tape. In practice, this effect is even more pronounced as the tape is fed out of the bin at higher speeds. As a result of such damage it is found that in practice the comparatively expensive master tape enables only a limited number of copies to be made, after which the master tape must be replaced and the copying process has to be interrupted. The risk of the damage also limits the exit speed of the tape from the bin and hence the cycling speed of the tape and the cycle time in the copying process.

SUMMARY OF THE INVENTION

The main walls of the storage bin are disposed vertically or substantially vertically, the entrance slot being situated near the upper side and the exit slot near the lower side of the bin. At their upper sides the wall portions which extend in a V-shape have outlets of pneumatic means to form a fluid cushion in the bin by means of upward mutually converging fluid jets, the upper side of the cushion being situated at a distance above the exit slot and the package of tape loops floating on said fluid cushion.

In such a vertically or substantially vertically disposed bin, in which the feed-through of the package of tape loops proceeds easily under the influence of gravity, the fluid cushion which is formed by the converging fluid jets and which is preferably situated substantially at the level where the discharge means terminate, ensures that the package of tape loops constantly floats at a distance from the exit slot. The V-shaped arrangement of the wall portions of the exit wall and the converging fluid streams emerging from these wall portions effectively ensure that the area of the package of tape loops above the exit slot remains clear to allow the tape to leave the package, which allows the tape, which generally still has a loop form as it leaves the package, to unfold with minimal deformation and to move through the exit slot in optimum alignment and at a uniform speed. These advantages are also obtained at comparatively high exit speeds of the tape; the apparatus in accordance with the invention thus enables the tape to be run at a comparatively high cycling speed and, outside the bin, at a uniform speed through, for example, a processing apparatus such as a copier, which is favourable for the cycle time and the quantity of the process to which the tape is to be subjected. The special features of the bin enable an endless tape of comparatively great length to be used, which in the case of an endless master magnetic tape allows recordings with a long playing time to be duplicated. Further, these advantages enable the tape-tension control externally of the bin to be simplified, which control ensures that during processing the tape is fed to a processing apparatus with a constant tape tension.

The floating suspension of the package of tape loops on the fluid cushion and the accurate alignment of the tape by the fluid jets at the entrance and exit slots in combination with the vertical arrangement of the bin ensure that the tape as it passes through the bin, is hardly in mechanical contact with any parts of the apparatus.

This minimizes the likelihood of tape damage, so that the apparatus in accordance with the invention is very suitable for handling comparatively thin endless tapes, such as the recently developed R-DAT magnetic tapes having a thickness of only 12 $\mu$m.

It is to be noted that a vertically disposed storage bin with a horizontal exit wall is known from U.S. Pat. No. 3,528,593. Fluid jets which are directed vertically upwards at opposite sides of the exit slot ensure that upon leaving the package of the loops the tape can unfold before it moves through the exit slot. However, for supporting the package of tape loops separate supporting members are provided in the bin. In practice, this leads to undesirable mechanical contact between the tape and parts of the bin.

In a preferred embodiment the exit wall of the bin is situated at the lower side and the wall portions arranged in a V-shape are provided with outlets of third pneumatic means and extensions of said wall portions being provided with outlets of the second pneumatic means, which outlets are situated substantially above the exit slot. Thus, the storage bin can store tape loops over a large distance between the entrance and the exit walls, the fluid cushion formed via the outlets of the second and third pneumatic means supporting the package of tape loops at a distance from the bottom of the bin. In this respect it is also important that the outlets of the second pneumatic means are situated above the exit slot, so that the fluid jets emerging from these outlets effectively constitute to the formation and maintenance of the package of tape loops.

However, the exit slot and the adjacent wall portions of the exit wall may alternatively be situated, for example, in a lower part of an upright side wall, in which case it is advantageous that the upper side of the fluid cushion is downwardly inclined towards the exit wall by a suitable arrangement of the outlets of the discharge means in the main wall.

The discharge means in the main wall may terminate in the proximity of the exit wall and may be disposed substantially horizontally, the remainder of the main wall having an imperforate surface. As a result of this, the fluid cushion supports the package of tape loops substantially horizontally at the lower side and the tape is withdrawn and fed to the exit slot through the V-shaped space underneath the package.

The size of the outlets of the discharge means may be adjustable. This enables the position of the upper side of the fluid cushion to be adjusted with respect to the level of the lower side of the package of tape loops. This may be important to adapt the operation of the fluid cushion to the length of the tape in the package of tape loops, thus also ensuring that the speed of the tape as it is fed through the exit slot is as constant as possible, which is important inter alia to simplify the tape-tension control externally of the storage bin. This enables the operation of the apparatus to be optimized with respect to the length of the magnetic tape to be cycled around.

The outlet of the discharge means may be constructed in various ways. For example, the outlets of the discharge means may have at least one slotted aperture in the main wall, such a slotted aperture being easy to form and resulting in a satisfactory positioning of the upper side of the fluid cushion and hence of the lower side of the package of tape loops.

In a further preferred embodiment the outlets of the discharge means have a row of circular apertures in the main wall, the use of round apertures of comparatively small diameters having the advantage that the tape cannot enter such an aperture. Such a row of apertures may extend across the full width of the storage bin.

In this respect it is advantageous if the peripheral walls of the slotted aperture or the round apertures in the main wall are upwardly inclined in an outward direction, viewed in a horizontal cross-section through the main wall. Such a construction ensures that the tape as it moves downwards cannot become entangled at the wall of the aperture.

The positions of the outlets in the extensions of the wall portions arranged in a V-shape may be adjustable in order to adjust the directions of the fluid jets from the second pneumatic means. This adjustability enables the fluid jets near the exit slot to be aligned accurately, which is an advantage because it enables the path taken by the tape as it leaves the exit slot to be defined accurately.

A further preferred embodiment is characterized in that outside the bin the tape is guided over a rotatable tape-tension wheel, a pad having a curved wall being situated adjacent a part of the circumferential wall of the wheel and outlets of fourth pneumatic means being situated in said curved wall, so that fluid jets press the tape against the wheel in substantially radial directions. The use of such a tape-tension wheel, against which the tape is pressed by fluid jets, positions the tape relative to the wheel in such a way that slipping is at least substantially precluded. The contact pressure exerted on the tape by the fluid jets is built up gradually, so that at the entrance side, where the tape begins to make contact with the wheel, the tape can align itself to some extent relative to the wheel. Thus, if the tape is not aligned correctly, the wheel can restore the correct position of the tape from the exit slot of the bin to the wheel and feed it on to a processing apparatus, such as the said copier, arranged behind the wheel. The tape-tension wheel and an associated braking motor enable the tape tension in the processing apparatus to be built up as constantly as possible. A tape-tension sensor may be included in the tape path to ensure that the tape tension is maintained constant via feedback to the motor. However, this can also be achieved without feedback by exerting a well-defined fixed braking torque on the wheel by means of the motor. Thus, the apparatus in accordance with the invention is capable of effectively eliminating tape-tension variations occurring after the tape has emerged from the bin.

In this respect another preferred embodiment of the apparatus in accordance with the invention is characterized in that the main walls of the storage bin are disposed vertically or substantially vertically, the entrance slot being situated near the upper side and the exit slot near the lower side of the bin, in that at least one of the main walls of the bin comprises discharge means for the discharge of fluid from the bin, which discharge means terminate in said main wall at a distance from the entrance wall and the exit wall, and in that outlets of third pneumatic means are situated near the lower side of the bin to form a fluid cushion in the bin by upwardly directed fluid jets, the upper side of said cushion being situated at a distance above the exit slot and the package of tape loops floating on said cushion.

The presence of grooves makes it possible to preclude a certain pressure build-up between the tape and the wheel surface under the influence of the force exerted by the fluid jets, which may cause slipping between the tape at the wheel.

The invention also relates to a method of copying magnetic tapes using such an apparatus for the storage and transport of a magnetic tape, in order to copy inclined signal tracks from a master magnetic tape on duplicate magnetic tapes.

A method adapted to copy inclined signal tracks from tapes onto duplicate tapes at a speed which is a multiple of the nominal tape speed is known, for example, from the document EP-A-208,471. In this known method the master tape is a length of tape wound between two reels. During winding the tape is brought into the copying contact with the duplicate tape. In this known method the master tape must be rewound after each copying cycle, so that the known method does not allow duplicate tapes to be manufactured in a continuous copying process.

In accordance with the inventive method the master tape is an endless tape and after it has been threaded in said apparatus the tape is passed through a storage bin of the apparatus as a package of tape loops, the master tape after emerging from the bin being in contact with a duplicate tape, during which contact the two tapes are fed through a contact-copying apparatus, the master tape being cycled through repeatedly in copying contact with a multitude of duplicate tapes. By thus continually cycling the master tape, duplicate tapes with inclined high-quality signal tracks can be produced rapidly in a contact-printing process, so that these copies can be made at comparatively low cost. This is, for example, of great importance in the aforementioned R-DAT system.

With respect to the foregoing another method in accordance with the invention is characterized in that as the master magnetic tape is run through only its coating side is in contact with the duplicate magnetic tape and with a capstan. Feeding the master magnetic tape in such a way that, apart from the contact of the tape with the capstan, only the coating side is in contact with the duplicate magnetic tape provides a satisfactory protection for the coating side. As a result of this the tape may be used for a very large number of passes before it has to be replaced because of wear. Preferably, this method utilizes fluid-cushion supports for guiding the master magnetic tape to prevent mechanical contact between the tape and the guide means. In this respect it is also important that the two tapes, as they are fed through the copying apparatus, are pressed against one another by fluid pressure.

FIG. 2 is an enlarged-scale view of the outlets of two penumatic pressure means, the exit slot of the bin and a number of further parts of the apparatus shown in FIG. 2;

FIG. 2a is a perspective view of one of the outlets shown in FIG. 2;

FIG. 3 is an enlarged scale exploded view of a tape-tension wheel and the associated parts in the apparatus shown in FIG. 1;

FIG. 3a is a sectional view taken on the line IIIa—IIIa in FIG. 3;

FIG. 4 is a view of a storage bin similar to that in FIG. 1, but in another embodiment of the apparatus;

FIG. 4a is a sectional view taken on the line IVa—IVa in FIG. 4; and

FIGS. 5a, 5b show a storage bin as shown in FIG. 1 in a further embodiment, the size of the outlet of the discharge means being set to a first position and a second position respectively.

DETAILED DESCRIPTION OF THE PREFERRED EMBODIMENTS

Figure 1:
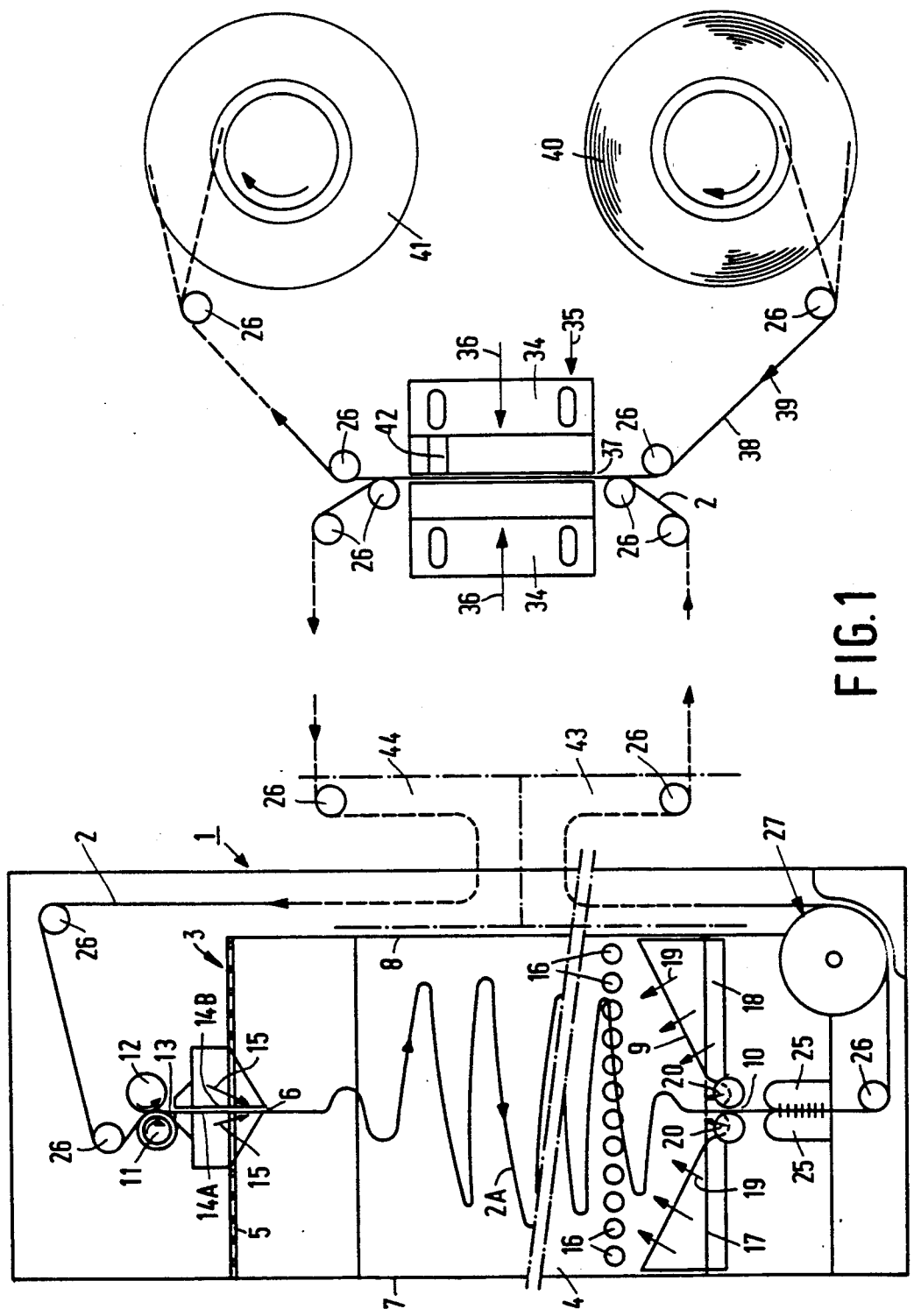
FIG. 1 is a diagrammatic view of the apparatus and the associated processing apparatus constituted by a copying apparatus.

FIG. 1 illustrates diagrammatically the arrangement of an apparatus 1 which is intended for the transport, storage and circulation of an endless master magnetic tape 2 and the storage of a length master magnetic tape and includes a storage bin 3 comprising vertically disposed main walls 4, of which a front main wall is visible and which main walls have smoothly finished inner sides. The apparatus further comprises an upper wall 5 provided with an entrance slot 6 and associated parts to be described hereinafter, which upper wall 5 is partly opened to allow air to escape from the bin 3. Further, upright side walls 7 and 8 are provided, whilst near the bottom an exit wall is arranged in which an exit slot 10 is formed.

At the upper side of the bin 3 a capstan system is arranged which is adapted to drive the master tape 2 and which comprises a capstan 11, which suitably presses against the coating side of the tape, and a pressure roller 12, which presses against the base side tape. The capstan is made of a non-magnetic material and is driven by an electric d.c. motor to obtain an accurately controlled tape speed.

A tape stripper 13 is arranged directly adjacent the capstan 11 to prevent the tape from wrapping itself around the capstan. It has a very smooth surface finish to preclude damage to the tape. The stripper 13 also serves for guiding the tape towards the bin 3. The gap between the capstan and the stripper is very narrow; for a tape thickness of 12 $\mu$m the gap has a maximum width of 6 $\mu$m. From the capstan 11 the tape 2 is led to the area of the entrance slot 6. At opposite sides this slot is bounded by facing walls 14A and 14B in which outlets of the first pneumatic means 15 are situated. These means 15 produce air jets which emerge from the outlets and which are directed downwardly at an angle of approximately 15° relative to the vertical plane. Thus, for example, three air jets emerging from three outlets in each wall 14A and 14B may act on the tape. The directions of the air jets are indicated by the arrows 15 in FIG. 1. By means of these air jets it is possible to maintain the speed of the tape 2 upon entry in the bin 3 and, in addition, to obtain a low tape tension in the tape downstream of the capstan 11. This is also important in order to prevent the tape around the capstan from wrapping itself around the pressure roller. It also provides a kind of blow-in effect, ensuring that the tape is driven in a stable manner inside the bin. As a result of this, the tape is taut as it enters the bin 3 through the entrance slot 6.

It is to be noted that the number of inlets and hence the number of air jets issuing from each wall 14A and 14B is variable. It is possible to employ a plurality of inlets of increasing diameter as the tape is fed in further, so that the air stream and hence the tape tension increase as the tape enters further. Such a construction also yields a very satisfactory result. In this way it is also ensured that the tape remains clear of the walls 14A, 14B. Further, it is to be noted that in the present description "air" is to be understood to mean also any other suitable fluid.

After the tape has entered the bin 3 the tape is influenced by air turbulences. These arise mainly as a result of air being blown in by the pneumatic means 15, which air tends to escape through the open upper wall 5. These air turbulences produce a kind of undulation in the tape 2, causing tape loops to be formed during the downward movement. During the downward movement the tape is guided at its edges by the two main walls 4. This remains so, even when the tape is temporarily stored in the bin in the form of a large package of tape loops. In order to ensure that the downward movement of the tape loops proceeds smoothly, it is important that the inner sides of the main walls are smooth, the front main wall being suitably slightly widened in an outward direction at substantially half the height, not only to assure a correct guidance of the package of tape loops but also to preclude congestion in the downward movement of the loops of tape. A slight degree of congestion of the tape in the tape package below the widened portion is not a problem because it is desirable that the package is stalled at this very location in a manner to be described hereinafter.

A row of circular openings 16 are provided in the front wall to allow the air to escape from the bin. Suitably the openings 16 are situated at a comparatively short distance from the exit slot 10, preferably in that part of the front main wall where the walls recede slightly from the wider part. Underneath the exit wall 9 plenum chambers 17 and 18 are arranged, which form part of third pneumatic means, indicated schematically by the arrow 19 and producing air jets which emerge from regularly distributed outlets in the exit wall 9 and which converge upwardly. The exit wall constituted by the upper sides of the plenum chambers 17 and 18 is arranged in a V-shape. The resulting air stream produces an air cushion above the exit wall 9, which air cushion in practice extends up to a height determined by the presence of the openings 16 which allow the air discharged by the pneumatic means 19 to escape from the bin 3. Thus, in practice the upper side of the air cushion is situated at a specific height relative to the exit wall 9 and the exit slot 10. This upper side of the air cushion supports the package of tape loops 2A. As a result of this the package of tape loops is "floating" relative to the bottom of the bin 3. Underneath the package of tape loops this creates a space which is free from tape loops and which allows the tape to come up to speed as it is withdrawn from the package, thereby precluding tape damage. This ensures a smooth exit of the tapes, the risk of tape loops being entangled in the exit slot 10 being virtually eliminated.

The feed-out of the tape from the bin 3 is assisted by the presence of second pneumatic pressure means 20, which are shown in more detail in FIGS. 2 and 2a. These pressure means comprise cylindrical intake chambers 21 which are arranged mirror-symmetrically relative to the ideal path of the tape 2 indicated by a dash-dot line in FIG. 2. In their upper sides the intake chambers 21 have outlets 22 through which upwardly converging air jets emerge. The arrow near the reference numeral 20 for the pressure means in FIGS. 1, 2 and 2a indicate the directions of the air jets emerging from the outlets 22. The outlets 22 are arranged so as to substantially adjoin and to be situated in line with the lowest parts of the upper sides (9) of the air-plenum chambers 17 and 18, i.e. above the slot 10 viewed in FIG. 2. Thus, the upper sides of the intake chambers 21 may be regarded as extension of the upper sides (9) of the air-plenum chambers 17 and 18. The directions of the air jets, as indicated by the arrow near the reference numeral 20, are adjustable in that the intake chambers 21 are arranged on adjustment means, which in the present case comprise slots 23 cooperating with bolts 24. This adjustment enables the position of the tape in the slot 10 to be adjusted accurately. In this respect it is important that the air jets emerging from the outlets 22 are directed in such a way that they are incident on the tape at the same location. By means of the air jets the pneumatic means 20 in conjunction with the action of the pressure means 19 ensure that the package of tape loops is additionally supported in the middle of the bin. Moreover, they ensure that the tape as it approaches the exit slot 10 is driven towards the centre and that tape loops formed as a result of static electricity are pulled apart. The adjustability enables the pneumatic means 20 to be aligned in order to obtain an accurately defined tape path. This accurately defined path enables the tape 2 to move freely through the slot 10. It is to be noted that, in a manner not shown, the outlets 22 of the pneumatic means 20 may be formed in the wall portions (9) of the air-plenum chambers 17 and 18 by constructing these chambers in such a way that they converge slightly further forwards each other.

After emergence from the bin 3 the tape is moved between two positioning blocks 25, between which an air-cushion support is sustained. For this purpose the facing sides of the blocks 25 are provided with passages or have pores. The air-cushion support thus obtained ensures that the subsequent tape transport proceeds in an unambigously defined position, whilst the tape is also given a small pretension. In addition, said air-cushion support ensures that even if a tape loop escapes through the exit slot the tape will be disentangled. Preferably, the distance between the facing walls of the blocks 25 decreases in a downward direction. For example, it is possible to use walls which converge towards one another.

After having passed the blocks 25 the tape 2 is passed over an air-cushion support 26. This air-cushion support belongs to a plurality of similar air-cushion supports arranged in the tape path, which each ensure that the tape follows an accurately defined path and which each assist in building up a slight tape tension. These air-cushion supports are important in order to preclude tape damage.

After having passed the air-cushion support 26 the tape 2 moves to a tape-tension device 27 which is shown in detail in FIG. 3. This tape-tension device comprises a tape-tension wheel 28 having a circumferential wall formed with grooves 29 near the periphery (see FIG. 3a). The tape-tension wheel cooperates with a pad 30 having a curved wall 31 which is situated adjacent a part of the circumferential wall of the wheel 28. Substantially radial air jets emerge from outlets 32 of fourth pneumatic means formed in the wall 31 to press the tape 2 against the circumference of the wheel during operation. In the present embodiment the wall 31 covers an arc of approximately 90° around the wheel 28, but this angle may be larger or smaller. The wheel 28 is connected to the shaft of electric braking motor 33 which, in a manner not shown, is connected to the control system. This control system may be a photo-cell detector, not shown, in a vacuum bin 34 (see FIG. 1) through which the tape is fed after passage of the wheel 28; however, alternatively the control system may be constructed in a different way, such as by means of a control arm which controls a variable resistor. However, it is also possible to connect the motor to a fixed resistor or to use a viscous coupling. The tape is pressed against the circumference of the wheel 28 by fourth pneumatic means, the force with which the tape is pressed onto the wheel increasing as the tape further enters the gap between the pad 30 and the circumference of the wheel 28. As a result of this, the pressure on the tape is built up gradually so that the tape, if it is not correctly pre-positioned, can align itself slightly relative to the edges of the wheel circumference. The advantage of the presence of the grooves 29 in the circumferential surface of the wheel is that it prevents air from being trapped between the tape and the wheel circumference, which may give rise to slipping. Alternatively, it is possible to draw the tape against the wheel by means of a vacuum. However, in practice the use of pressurized air results in a higher pressure build-up at the wheel, enabling a wheel of small diameter to be used. The tape-tension device 27 thus provides a highly constant and well-defined tape tension in the tape path and, by controlling the braking motor 33, a feedback system can be obtained, which is of particular advantage at higher tape speeds. It is to be noted that the gap between the wall 31 and the circumference of the wheel 28 may be sealed by means of a labyrinth construction in order to minimize air consumption. For the tape-tension device 27 it is also advantageous that the risk of the tape damage is minimized by the use of pressurized air.

The tape 2 moves from the tape-tension device 27 to the vacuum bin 43, after which the tape is again moved over an air-cushion support 26. As already stated in the foregoing it is possible to realize a control system for controlling the tape tension by means of the vacuum bin 43. Further, the tape is guided over three air-cushion supports 26 and fed between two platers 34 which form part of a contact copying apparatus 35, which platers 34 are adjustable towards one another as indicated by the arrows 36 and can be immobilized in a manner not shown. Thus, a gap 37 is formed between the platers 34, through which gap the tape 2 travels and in which gap an air-cushion support is formed in a manner not shown, so that the tape 2 is brought in intimate contact with a duplicate tape 38, which is wound in a direction indicated by the arrow 39 from a tape reel 40 to a tape reel 41. During this contact a magnetic head 42 forms a magnetic field in the gap 37. As a result of the contact between the two tapes 2 and 38 a pattern of inclined signal tracks is now transferred from the tape 2 to the duplicate tape 38 via a contact-printing process. This process and the construction of the copying apparatus 35 are described in detail in the non-prepublished Netherlands Patent Application 8701477 (PHQ 87.015), filed on Jun. 25, 1987 (herewith incorporated by reference). The apparatus 1 enables this process to be carried out at a high speed of transport of the tape 2. After emerging from the copying apparatus 35 the tape is then passed through a second vacuum bin 44 of the same construction as the bin 43.

The apparatus 1 enables a continuous copying process, for example for the said R-DAT system, to be obtained at a speed corresponding to 80 to 240 times the nominal speed for said R-DAT system, i.e. the speed during normal reproduction of the tape.

It is to be noted that the guidance of the tape 2 in the bin can be adapted to the length of the tape. For this purpose, in a manner not shown, two upright adjustable side walls may be arranged inside the bin, whose mutual spacing is adjustable depending on the length of tape to be stored in the bin.

FIG. 4 show that the discharge means in the front wall 4 of the bin, for allowing air of the air cushion to escape, can also be constructed in another manner than shown in FIG. 1. For example, it is possible to use a slot 45 having a special shape as shown in FIG. 4a, namely a slot which in such sectional view extends upwardly in an outward direction. Thus, during the downward movement under the influence of gravity the tape cannot engage a sharp edge from the inner side of the bin. In practice, the angle indicated in FIG. 4a may vary from 90° to approximately 15°. Such a slot of suitably adapted shape can be formed easily and yields satisfactorily practical results.

Further, as is shown in FIGS. 5a and 5b, it is possible to partly shield the slot 45 or, as the case may be, the holes 16 using shielding walls 46. Thus it is possible to adjust the shape and level of the lower side of the package of tape loops 2a. In the embodiment shown in FIG. 5a the air cushion has a shape which tapers down towards the centre and in FIG. 5b the shape is inverted. These steps are also important for adjusting the length of tape in the package of tape loops, to maintain the speed of the tape constant and thereby minimize "whip lash" effects in the tape path near the exit slot 10. Such a step simplifies the necessary tape tension control in the remainder of the tape path.

It is to be noted that more modifications are possible. For example, the plenum chambers 17 and 18 of the pneumatic means 17 may be provided with porous wall or with slots instead of circular outlets. Further, it is possible to arrange the exit slot 10 near the lower part of the side wall 8 instead of in the bottom wall. The air flow as a result of the third pneumatic means 19 must then be adapted and the shape of the air cushion must be adapted accordingly by a suitable arrangement of the openings 16. Preferably, the upper side of the air cushion for example slopes downwards from the side wall 9 towards the side wall 7, to provide adequate freedom around the exit slot in the side wall 8.

Further, it is to be noted that the apparatus in accordance with the invention can be combined very favourably with the copying apparatus 35 intended for copying tapes with inclined tracks. Together these two apparatuses 1 and 35 form a combination which guarantees a very fast and high-quality copying process. An advantage is that both apparatuses operate with air pressure, enabling a single source of pressurized air to be used. Moreover, the tape is always guided on air-cushion supports, so that in particular the master tape 2 is subject to minimal wear and can be used for a prolonged period. In this respect it is important that the coating side of the tape is correctly guided over the air-cushion bearings and has minimal mechanical contact with parts of the apparatuses.

It is to be noted further that the combination of the apparatus 1 and the apparatus 35 is also suitable for copying other tapes than R-DAT tapes; for example, the apparatus can also be used for copying 8-mm video tapes. It is to be noted also that the apparatus 1 with the bin 3 can handle other tapes than magnetic tapes in cases where an endless tape must be circulated. Examples of this are paper tapes or printer ribbons.

Moreover, it is to be noted that the apparatuses 1 and 35 in the present embodiment are constructed as separate units and are coupled to each other during the circulation of the magnetic tape 2. This enables one of the two apparatuses to be replaced, for example in order to change the master tape 2 or to eliminate a fault. However, it is alternatively possible to construct the apparatuses 1 and 35 as an integrated unit, the platers 34 being arranged for example directly downstream the tape-tension device 27.

What is claimed is:

1. An apparatus for the storage and transport of an elongate endless tape, comprising:
    a vertically oriented storage bin in which at least a part of the tape is stored as a package of tape loops, which bin comprises an at least substantially vertical front main wall and rear main wall, for guiding the edge of the tape, two sidewalls, an entrance wall, and an exit wall, an entrance slot in the entrance wall, first pneumatic pressure means having first outlet means near said entrance slot to assist the supply of tape through the entrance slot, an exit slot in the exit wall, second pneumatic pressure means having second outlet means near said exit slot to assist the exit of the tape through the exit slot, discharge means in at least one of said front main wall and rear main wall for discharging fluid from the bin, at a distance from the entrance wall and the exit wall, the exit wall comprises wall portions which extend from the narrow sidewalls of the bin towards the exit slot in a V-shape, and third pneumatic means for forming a tape supporting fluid cushion in the bin, the upper side of the cushion being situated at a distance above the exit slot and the package of tape loops floating on said cushion.

2. An apparatus as claimed in claim 1, in which the third pneumatic means comprises a plurality of third outlets in the V-shaped wall portion; and
    the second pneumatic means comprises extensions of said wall portions having second outlets formed therein which second outlets are situated above the exit slot.

3. An apparatus as claimed in claim 2, in which the V-shaped wall portions comprise the upper sides of the first and second air-plenum chambers, in which the third outlets are regularly distributed in said V-shaped wall portions and the extensions comprise two intake chambers in whose upper sides the outlets are formed.

4. An apparatus as in claim 2 wherein the outlets in said extension of the wall portions arranged in a V-shape comprise adjustment means to adjust the directions of the fluid jets from the second pneumatic means.

5. An apparatus as claimed in claim 1, in which the discharge means comprises means in said main wall terminating in the proximity of the exit wall and disposed substantially horizontally.

6. An apparatus as claimed in claim 5, in which the discharge means comprises adjustable sized outlets.

7. An apparatus as claimed in claim 5 in which the outlets of the discharge means comprise at least one slotted aperture in said main wall.

8. An apparatus as claimed in claim 7, in which peripheral walls of the apertures in said main wall are upwardly inclined in an outward direction, viewed in a horizontal cross section through said main wall.

9. An apparatus as claimed in claim 5, in which the outlets of the discharge means comprise a row of circular apertures in said main wall.

10. An apparatus as in claim 1 further comprising tape guiding means outside the bin including a rotatable tape-tension wheel, a pad having a curved wall being situated adjacent a part of the tape tension wheel and fourth pneumatic means having outlets situated in said curved wall, so that fluid jets press the tape against the wheel in substantially radial directions.

11. An apparatus as claimed in claim 10, in which the tape-tension wheel comprises a circumferential wall having circumferential grooves near the edges.

12. Apparatus for storing and transporting an endless elongate tape comprising:
    an at least substantially vertical storage bin for storing and transporting a bundle of loops of the tape;
    entrance means disposed at the top of the storage bin for guiding the tape into the bin;
    exit means disposed at the bottom of the bin for guiding the tape out of the bin; and
    pneumatic means disposed between the entrance means and the exit means for forming a pneumatic cushion for supporting the bundle of tape loops within the bin at a position spaced above the exit means.

* * * * *